(12) United States Patent
Fan et al.

(10) Patent No.: US 9,180,420 B1
(45) Date of Patent: *Nov. 10, 2015

(54) TUNING AND SYNTHESIS OF METALLIC NANOSTRUCTURES BY MECHANICAL COMPRESSION

(71) Applicant: Sandia Corporation, Albuquerque, NM (US)

(72) Inventors: Hongyou Fan, Albuquerque, NM (US); Binsong Li, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 139 days.

This patent is subject to a terminal disclaimer.

(21) Appl. No.: 13/905,965

(22) Filed: May 30, 2013

Related U.S. Application Data

(63) Continuation-in-part of application No. 12/880,886, filed on Sep. 13, 2010, now Pat. No. 8,455,048.

(60) Provisional application No. 61/315,270, filed on Mar. 18, 2010.

(51) Int. Cl.
| | | |
|---|---|---|
| *B05D 3/12* | (2006.01) | |
| *B01J 8/00* | (2006.01) | |
| *B22F 1/00* | (2006.01) | |
| *B82Y 40/00* | (2011.01) | |
| *B82Y 30/00* | (2011.01) | |

(52) U.S. Cl.
CPC ... *B01J 8/00* (2013.01); *B05D 3/12* (2013.01); *B22F 1/0018* (2013.01); *B22F 2202/00* (2013.01); *B22F 2301/255* (2013.01); *B82Y 30/00* (2013.01); *B82Y 40/00* (2013.01)

(58) Field of Classification Search
CPC .......... B05D 3/12; B82Y 30/00; B82Y 40/00; B22F 1/0018; B22F 1/0022; B22F 2202/00; B22F 2301/255
USPC .......................... 427/355, 359, 360, 365, 369
See application file for complete search history.

(56) References Cited

U.S. PATENT DOCUMENTS

| | | | | |
|---|---|---|---|---|
| 6,395,214 | B1 * | 5/2002 | Kear et al. ...................... | 264/434 |
| 8,092,595 | B1 * | 1/2012 | Fan et al. ......................... | 117/70 |
| 2011/0130478 | A1 * | 6/2011 | Warren et al. ................. | 521/153 |

OTHER PUBLICATIONS

Tolbert et al., "High-Pressure Structural Transformations in Semiconductor Nanocrystals", Annu. Rev. Phys. Chem. 46, 1995, pp. 595-625.*

Dong et al., "Pressure-induced morphology-dependent phase transformations of nanostructured tin dioxide," Chemical Physics Letters 480, 2009, pp. 90-95.*

* cited by examiner

*Primary Examiner* — Kirsten Jolley
(74) *Attorney, Agent, or Firm* — Kevin W. Bieg

(57) ABSTRACT

The present invention provides a pressure-induced phase transformation process to engineer metal nanoparticle architectures and to fabricate new nanostructured materials. The reversible changes of the nanoparticle unit cell dimension under pressure allow precise control over interparticle separation in 2D or 3D nanoparticle assemblies, offering unique robustness for interrogation of both quantum and classic coupling interactions. Irreversible changes above a threshold pressure of about 8 GPa enables new nanostructures, such as nanorods, nanowires, or nanosheets.

11 Claims, 16 Drawing Sheets

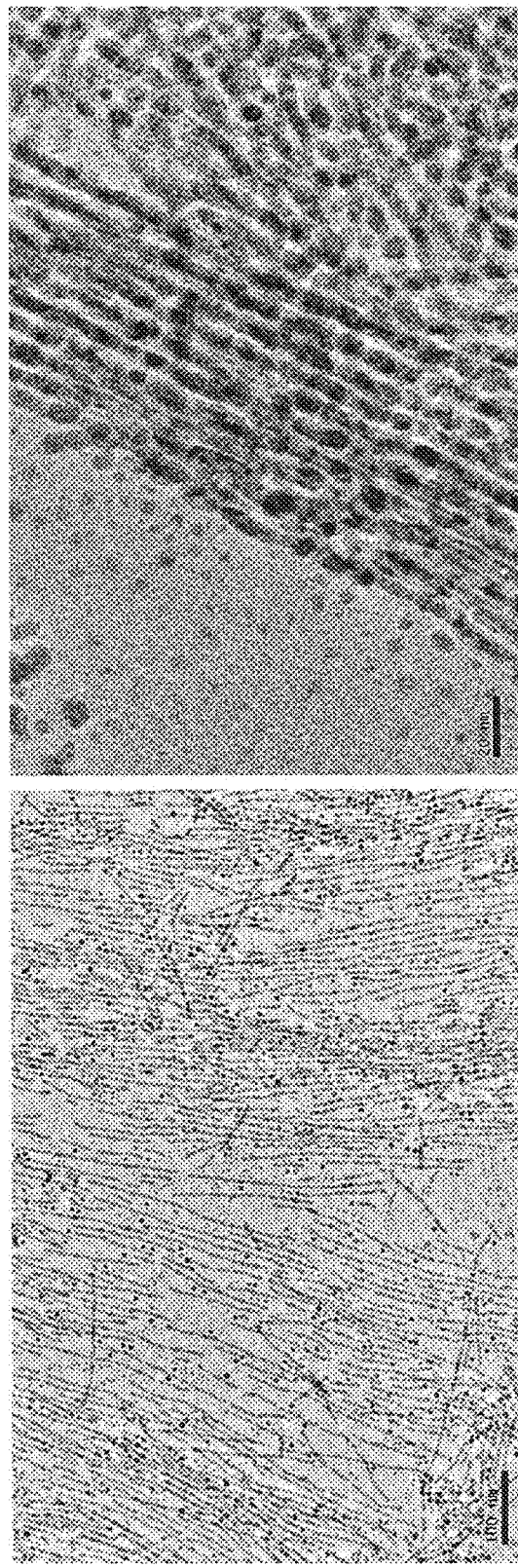

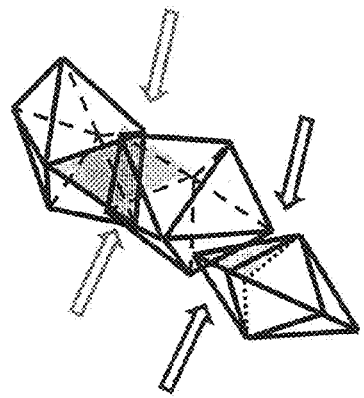
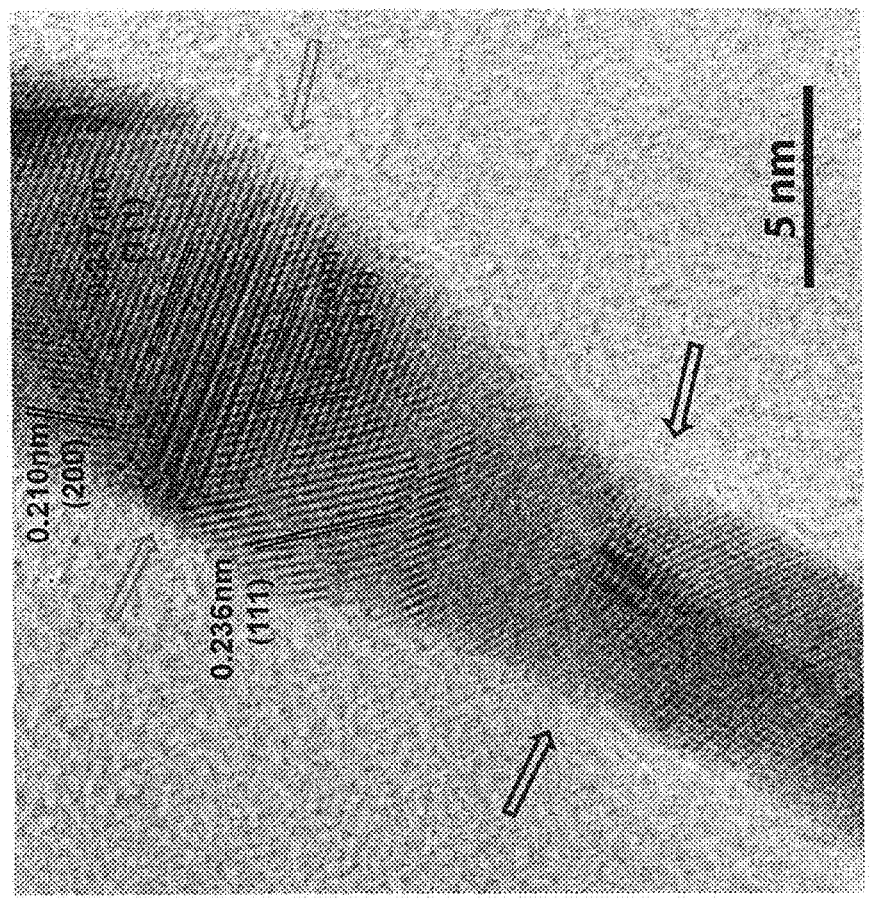
FIG. 13(b)
FIG. 13(a)

US 9,180,420 B1

TUNING AND SYNTHESIS OF METALLIC NANOSTRUCTURES BY MECHANICAL COMPRESSION

CROSS-REFERENCE TO RELATED APPLICATIONS

This application is a continuation-in-part of U.S. application Ser. No. 12/880,886, filed Sep. 13, 2010, which application claimed the benefit of U.S. Provisional Application No. 61/315,270, filed Mar. 18, 2010, both of which are incorporated herein by reference.

STATEMENT OF GOVERNMENT INTEREST

This invention was made with Government support under Contract No. DE-AC04-94AL85000 awarded by the Department of Energy. The Government has certain rights in the invention.

FIELD OF THE INVENTION

The present invention relates to a method of making metallic nanomaterials and, in particular, to a method to tune and synthesize metallic nanostructures by mechanical compression.

BACKGROUND OF THE INVENTION

Due to the size- and shape-dependent properties, nanoparticles have been successfully used as functional building blocks to fabricate multi-dimensional (D) ordered assemblies for the development of 'artificial solids' (e.g., metamaterials) with potential applications in nanoelectronic and optic devices. To date, fabrications of ordered nanoparticle assemblies have relied on specific interparticle chemical or physical interactions such as van der Waals interactions, dipole-dipole interaction, chemical reactions, and DNA-templating. The consequent self-assembly scenario is the formation of higher dimensional nanoparticle architectures from single nanoparticles. However, a need remains for a method to produce chemically and mechanically stable nanostructures which are not possible using current top-down and bottom-up methods.

SUMMARY OF THE INVENTION

The present invention is directed to a method for the tuning or synthesis of metallic nanostructures by mechanical compression, comprising providing a film comprising a periodically ordered assembly of metallic nanoparticles in a pressure-transmitting medium; and applying pressure to the film, thereby compressing the periodically ordered assembly of metallic nanoparticles. The metallic nanoparticles preferably comprise a noble metal, such as gold or silver. The pressure-transmitting medium can be a liquid or polymer. For example, the periodically ordered assembly can comprise a face-centered-cubic mesophase. For example, pressure can be applied using a diamond anvil cell, piston-cylinder device, multi-anvil cell, or embossing machine. The film can be compressed to a pressure below a threshold pressure to reversibly tune the interparticle spacing of the periodically ordered assembly of metallic nanoparticles. Alternatively, the film can be compressed to a pressure above the threshold pressure above which the metallic nanoparticles contact, coalesce, and sinter to synthesize a new nanostructure, such as a nanorod or nanowire. The threshold pressure can typically be about 8 GPa. Following release of pressure, the new nanostructure can be redispersed in an organic solvent.

The method of the present invention provides a pressure-induced phase transformation process to engineer nanoparticle architectures and to fabricate new nanostructured materials. The reversible changes of the nanoparticle unit cell dimension under pressure allow precise control over interparticle separation in 2D or 3D nanoparticle assemblies, offering unique robustness for interrogation of both quantum and classic coupling interactions. The fundamental understanding of nanoparticle assembly under pressure provides useful insight for material integration through pressure-driven nanofabrication processes.

BRIEF DESCRIPTION OF THE DRAWINGS

The detailed description will refer to the following drawings, wherein like elements are referred to by like numbers.

FIG. 10(a) is a low resolution TEM image of the silver nanowires formed by compression at high pressure and release to ambient. FIG. 10(b) is a HRTEM image of the formed silver nanowires.

FIG. 13(a) is an HRTEM image of the silver nanowire. FIG. 13(b) is a model of the sintering of three decahedral nanoparticles.

DETAILED DESCRIPTION OF THE INVENTION

Figure 1:
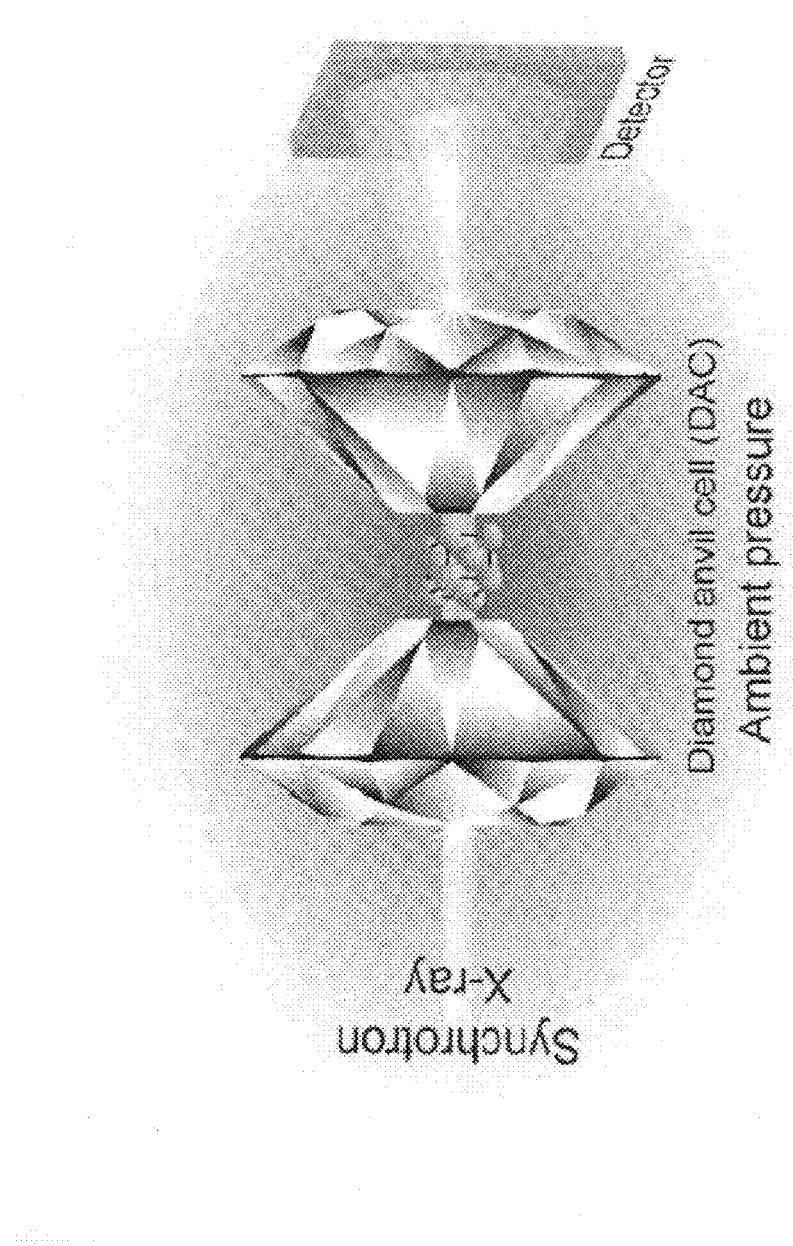
FIG. 1 is an Illustration of a nanoparticle film loaded into a diamond anvil cell.

The present invention is directed to an external pressure-induced engineering pathway to convert three-dimensional (3D) ordered spherical nanoparticle assemblies to one or two dimensional (1D or 2D) nanostructures and form ultrahigh density ordered nanostructures. A diamond anvil cell (DAC) can be used to mechanically compress the nanoparticle assemblies. A DAC consists of two opposing diamonds with a sample compressed between the culets. Pressure can be monitored using a reference material, such as ruby fluorescence, whose behavior under pressure is known. The uniaxial pressure supplied by the DAC may be transformed into uniform hydrostatic pressure using a pressure transmitting medium. The pressure-transmitting medium is enclosed by a gasket and the two diamond anvils. FIG. 1 is a schematic illustration of a DAC that can be used for mechanical compression of a nanoparticle assembly. The nanoparticle assemblies can be embedded in a polymer (e.g., polystyrene) film as the pressure transmitting medium. Liquid silicone oil can be used as the pressure-transmitting medium. Transparency of the DAC allows in-situ optical characterizations of interparticle-spacing-based physics and monitoring of the structural evolution of nanoparticle assembly using synchrotron x-ray scattering. In particular, in-situ small-(SAXS) and wide-angle (WAXS) synchrotron X-ray scattering measurements on the same spot of a sample under pressure coupled with transmission electron microscopy (TEM) enable reconstruction of the ordering of nanoparticles to form nanorods and nanosheets upon mechanical compression. Other moderate- and high-pressure compression devices can also be used, such as piston-cylinder devices, multi-anvil cells, or embossing machines.

External pressure provides an efficient process to engineer nanoparticle assemblies and to fabricate new complex nanoparticle architectures without relying on specific chemical and physical interaction. The reversible changes of the nanoparticle unit cell dimension under pressure allow precise control over interparticle separation in 2D or 3D nanoparticle assemblies. Under high pressure, the nanoparticles start to sinter. The initial nanoparticle assembly framework (including orientations, dimensions) is crucial for the nanoparticle phase transformation and formation of complex nanostructures. The mechanical flexibility of polymer medium provides sufficient compressibility to maintain the ordered mesophase and the favorable orientation while the unit cell dimension shrinks.

As an example of the present invention, ordered spherical gold or silver nanoparticle films with face-centered-cubic (fcc) mesophase were compressed with a DAC. In situ high-pressure small angle x-ray scattering measurements show that gradual elevation of external pressure from atmospheric pressure to 8-9 gigapascal (GPa) causes reversible shrinkage of interparticle spacing. Pressures the threshold pressure of 8-9 GPa and 13 GPa drive the nanoparticles to coalesce, typically forming 1D nanostructures (nanorods or nanowires) and their ordered hexagonal arrays with p6 mm symmetry. Dispersion of the sintered nanostructures in organic solvents results in uniform single nanostructures that can re-assemble into ordered arrays upon solvent evaporation. This method is a simple yet efficient nanoengineering process to tune nanoparticle assemblies and fabrications of new complex nanoparticle architectures.

Spherical metal nanoparticles were synthesized using a standard one-phase method. The metals used were gold and silver. The gold nanoparticles formed had an average diameter of 5.2 nm with a standard deviation of 4.2%. The silver nanoparticles formed also had an average diameter of approximately 5 nm. The fcc-ordered gold or silver nanoparticle polymer films were fabricated through a solvent evaporation process on silicon wafers. In this process, gold (or silver) nanoparticles (approximately 80 mg) and 20 mg of polystyrene with a molecular weight of 1.7 k were dissolved in 1 mL of a solvent such as toluene. Alternatively, poly (methyl methacrylate) (PMMA) was used as the matrix instead of polystyrene. Ordered nanoparticle films were formed upon solvent evaporation by spin-coating or casting on silicon wafers.

At a high spin rate (2000 rpm), the nanoparticle films were formed with thin thickness (0.4~1.5 µm). A piece of the nanoparticle film (about 100×150 µm) was freed from the substrate and loaded directly into a DAC for in situ pressure measurement. Two gem-quality diamond anvils with a culet size of 500 µm were aligned to generate pressure. A stainless-steel gasket was pre-indented, and the thickness reduced from 250 µm down to 70 µm. A 250-µm-diameter hole was drilled and served as the sample chamber. Silicone oil was used as the pressure transmitting fluid. The pressure in the diamond cell was determined using a standard pressure-dependent ruby fluorescent method. Upon pressure release from 9.4 GPa, the sample was carefully removed from the gasket and cleaned by a small amount of solvents (for example, ethanol, toluene, and hexane).

Figure 2:
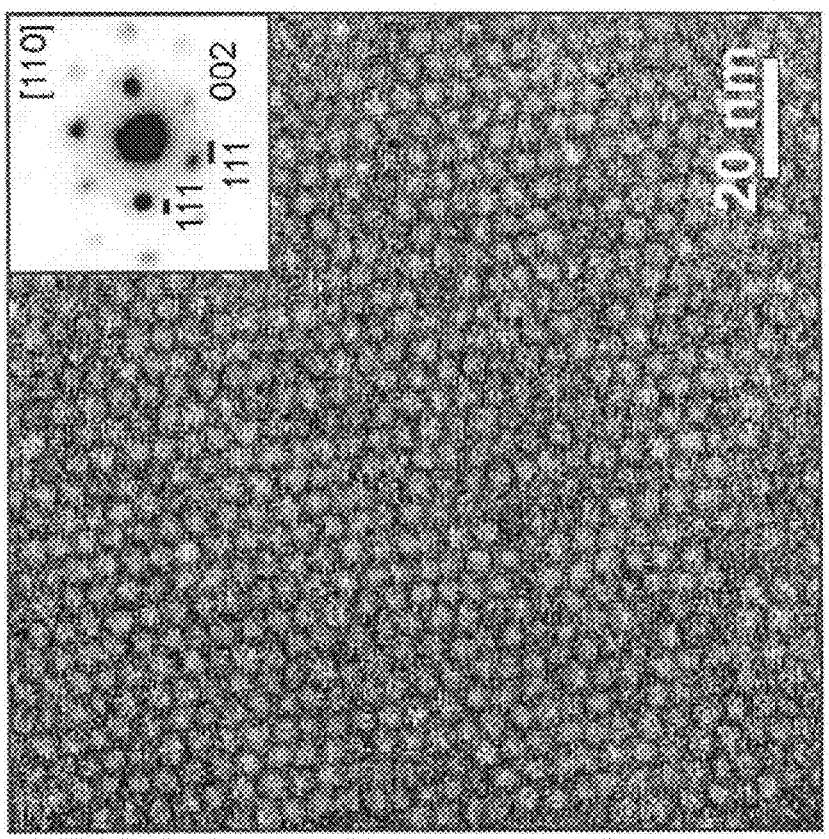
FIG. 2 shows a scanning electron microscope (SEM) image of [110] orientation of an ordered gold nanoparticle film.
Figure 3:
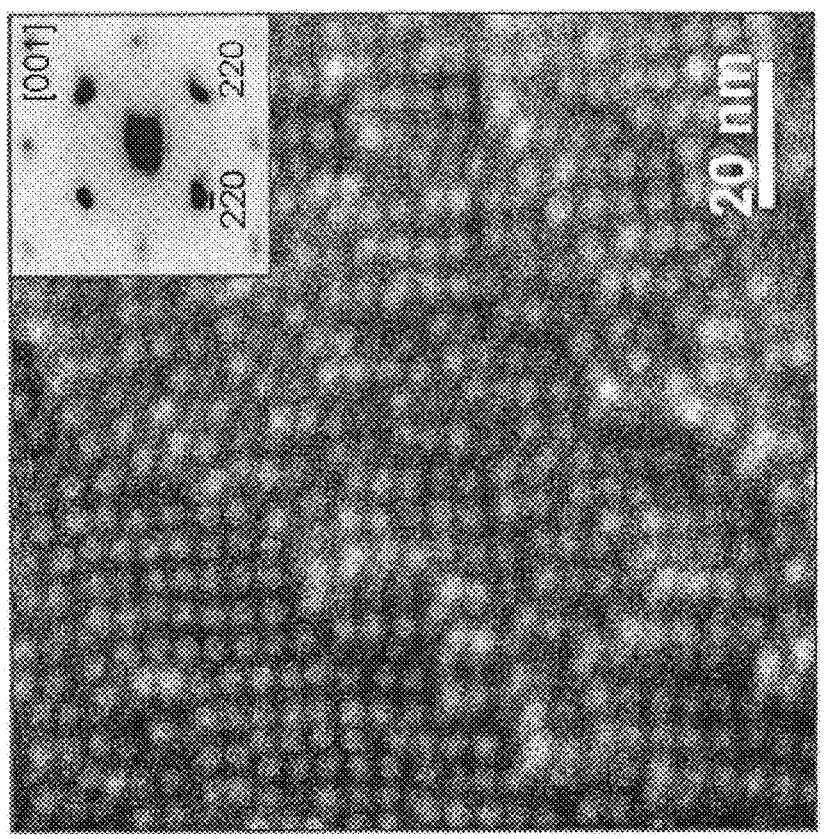
FIG. 3 shows a cross-sectional SEM image of an ordered gold nanoparticle film.

In another embodiment, at a low spin rate (500 rpm), the nanoparticle films were formed with thick thickness. The resultant gold nanoparticles film had an fcc assembled structure with the [110] direction parallel to the substrate. Upon loading of the ordered nanoparticle film into the DAC, the film maintained the fcc mesophase and exhibited [110]-orientation confirmed by SAXS and microscope measurement. The SAXS pattern and integrated spectrum collected at ambient pressure indicated a pattern specific to fcc mesophase with Fm$\overline{3}$m space group. The nanoparticle assembly exhibited preferred packing orientation with [110] direction parallel to the substrate, thus vertical to the beam line. The unit cell parameter a was calculated to be 104.0 Å. Representative scanning electron microscope (SEM) images (shown in FIGS. 2 and 3) taken from the surface and cross-section of the gold nanoparticle film revealed that the film consisted of 3D ordered assembly or array. Both electron diffraction pattern and fast-Fourier transform analyses confirmed that gold nanoparticles were organized in a periodic, ordered fcc mesophase with a preferred orientation along [110] direction.

The nanoparticle film was gradually compressed in the DAC from ambient pressure to 13 GPa and gradually released back to ambient pressure at room temperature. The SAXS pattern and integrated spectrum obtained were consistent with a 2D hexagonal mesophase with p6 mm symmetry. The primary peaks were assigned as 100, 110, 200, 210, and 300 reflections. Representative electron microscopic images of the samples after the pressure was released from 13 GPa to ambient pressure show that the ordered fcc spherical nanoparticle superlattice was converted to an ordered nanowire array. The gold nanowire array consists of individual gold nanowires with hexagonal close packing. Representative SEM images of [100]- and [110]-oriented nanowire mesophases along with their corresponding electron diffraction patterns were consistent with a unit cell with lattice parameter $a_{hex}$=81.4 Å and a uniform, minimum center-to-center spacing between nanowires of 8.1 nm. Based on the packing geometry, this corresponds to an ultrahigh nanowire density of approximately 1.7×10$^{12}$ nanowires per square centimeter. As shown in obtained SEM images, the two end facets of the nanowire bundles were very flat, suggesting a constant length of nanowires. Single nanowires can be obtained by dispersion of the nanowire arrays in organic solvents (for example, toluene). TEM images of the nanowires also showed that the nanowires were uniform in diameter and length. The average diameter is 6.1 nm with a standard deviation of 4.6%. The length is consistent with the distance between the two end faces, ranging from 400 nm to 1.5 μm, depending on the initial film thickness of the ordered nanoparticles. For the thin film, short nanowires (or nanorods) are obtained. High-resolution TEM imaging revealed that the gold nanowires were polycrystalline. Along the c-axis, each nanowire consisted of crystalline nanodomains whose size was close to that of original spherical gold nanoparticles. This indicates that the formation of gold nanowires occurs through sintering of spherical gold nanoparticles to form the nanowire c-axis, which was further confirmed by TEM studies. By sintering, it is meant that the nanowires formed are a coherent bonded mass formed by the nanoparticles without interspersed organic materials. These individual nanowires can form stable colloidal dispersions in organic solvents and re-assemble into ordered arrays upon solvent evaporation. Overall, the method of the present invention provides greater control over both the uniform length of nanowires and the formation of ordered, ultrahigh density of nanowire arrays in comparison with chemical methods.

As another example, 80 mg of gold nanoparticles and 20 mg of polystyrene with a molecular weight of 2M were dissolved in 1 mL of toluene. At a spin rate (2000 rpm), the nanoparticle films were formed with a thin thickness. The resultant gold nanoparticles film had an fcc assembled structure with the [111] direction parallel to the substrate. Then a similar process was carried out as in the prior described example. The nanoparticle film was gradually compressed in the DAC from ambient pressure to 13 GPa and gradually released back to ambient pressure at room temperature. Another example used the same parameters except a spin rate of 500 rpm was used, obtaining similar results.

Figure 4:
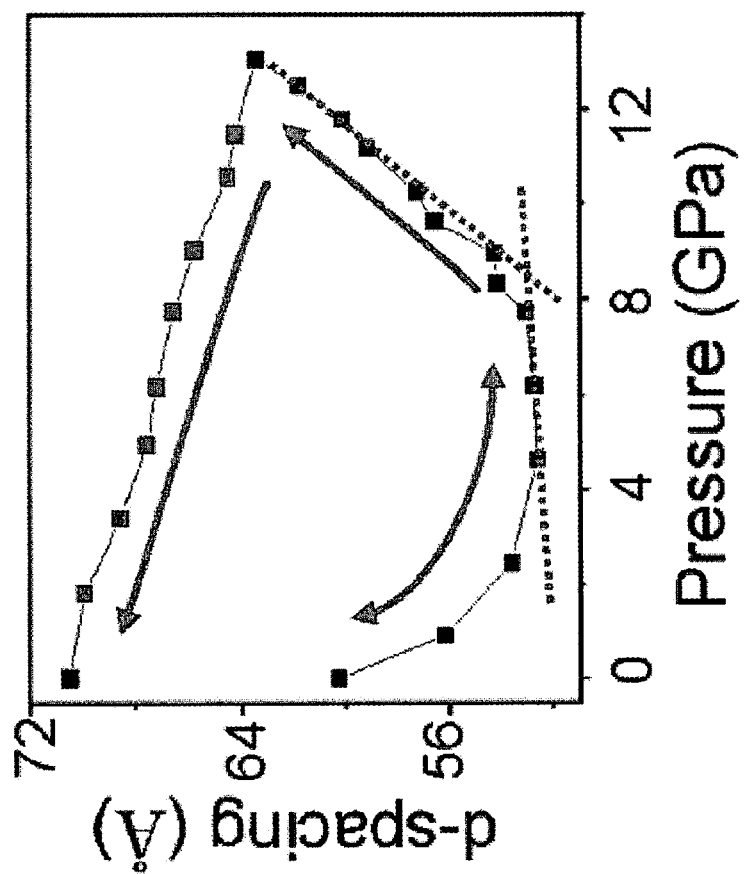
FIG. 4 illustrates the d-spacing changes as a function of pressure.
Figure 5:
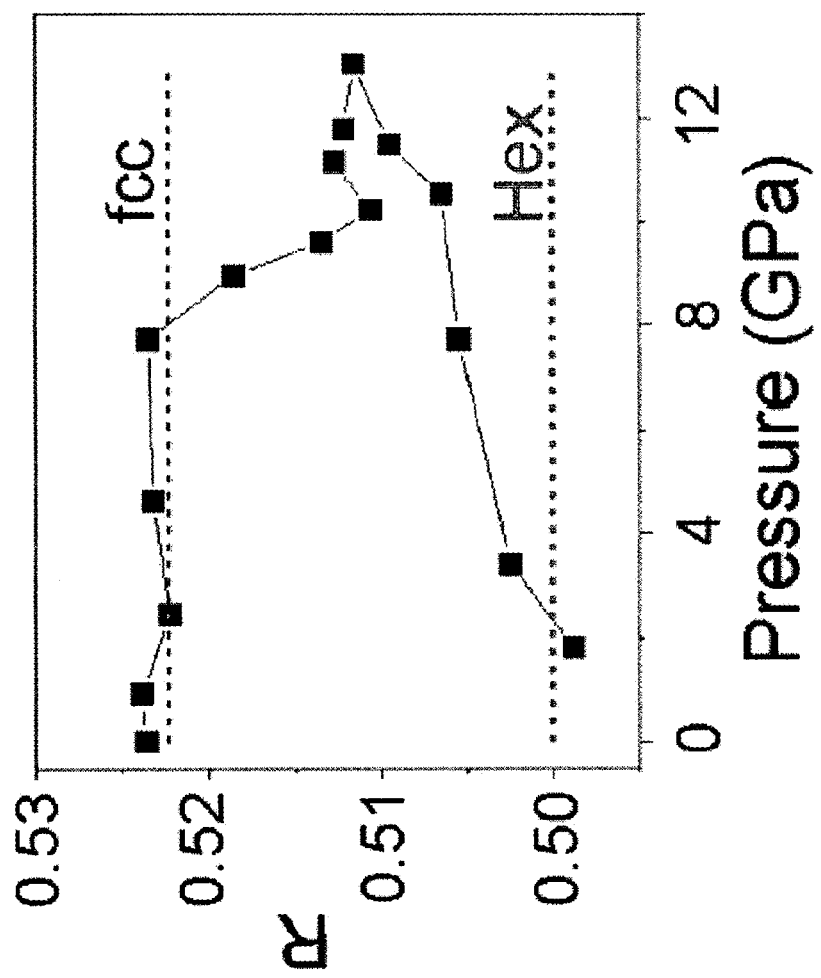
FIG. 5 illustrates the d-spacing ratios as a function of pressure.

To investigate the nanoparticle assembly pathway and the nanowire formation process, in situ high-pressure small angle scattering (HP-SAXS) experiments were performed to follow the structure evolution of the nanoparticle films during the compression and release processes. The HP-SAXS results suggest the formation of gold nanowire arrays via phase transformation from a 3D fcc mesophase to a 2D hexagonal nanowire mesophase. Before formation of gold nanowires, the spherical nanoparticle mesophase exhibits reversible unit cell dimension shrinkage. During this reversible process, the interparticle separation dimension can be precisely controlled by external pressure. Representative HP-SAXS patterns were collected at varied compression and release pressures. At ambient pressure, the gold nanoparticle film exhibited fcc mesophase. In the range from ambient pressure to 8.9 GPa, HP-SAXS data indicated that the gold nanoparticle assembly remained in the fcc structure with [110]-orientation. As the pressure was increased to 8.9 GPa, all the HP-SAXS peaks shifted slightly to higher 2θ (lower d-spacing), indicating shrinkage in the unit cell dimension. When the pressure was gradually released, all peaks returned to their starting positions. Thus, the change of the unit cell dimension is reversible between ambient pressure and 8.9 GPa. This reversible behavior was further verified on the d-spacing changes) as shown in FIG. 4) and the constancy of the d-spacing ratio R (as shown in FIG. 5) at varied pressures. Below 8.9 GPa, R stays constant and close to the theoretical value of R=$d_{311}$/$d_{311}$=$\sqrt{3/11}$=0.522 for an fcc mesophase. The lattice constant shrinks from 104 Å at ambient pressure to 91 Å at 8.9 GPa and returns to 103 Å when the pressure is completely released. Consequently, the interparticle separation distance along [110] direction varied reversibly between 74 Å and 64 Å. Below 8.9 GPa, the nanoparticles were not connected. This was evidenced by the fact that the closest center-to-center particle distance was 64.4 Å at 7.7 GPa, slightly larger than the diameter of 5.2 nm of the gold nanoparticle.

The nanoparticle assembly exhibited an intermediate structure that cannot be assigned as either fcc or 2D hexagonal during the course of increasing the hydrostatic pressure to 8.9 GPa, increasing the pressure non-hydrostatically to 13 GPa, and then decreasing the pressure to 7.7 GPa. Therefore, the unit cell dimension changes are irreversible during this pressure course. HP-SAXS data show that all the peaks shift to lower 2θ (higher d-spacing), rather than a continuous shift to lower d-spacing. This suggests that a structure transformation had taken place. More importantly, the d-spacing ratio R moves away from the theoretical value of 0.522 down to approximately 0.51, further confirming a structural transformation. When the pressure was released to 7.7 GPa, all the HP-SAXS peaks continue to shift to lower 2θ instead of reversibly returning to their original positions. Below 7.7 GPa, the d-spacing ratio further decreases down to approximately 0.5, the theoretical $d_{200}$/$d_{100}$ ratio for 2D hexagonal mesophase. In addition, the HP-SAXS patterns are consistent with 2D hexagonal mesophase.

Figure 6:
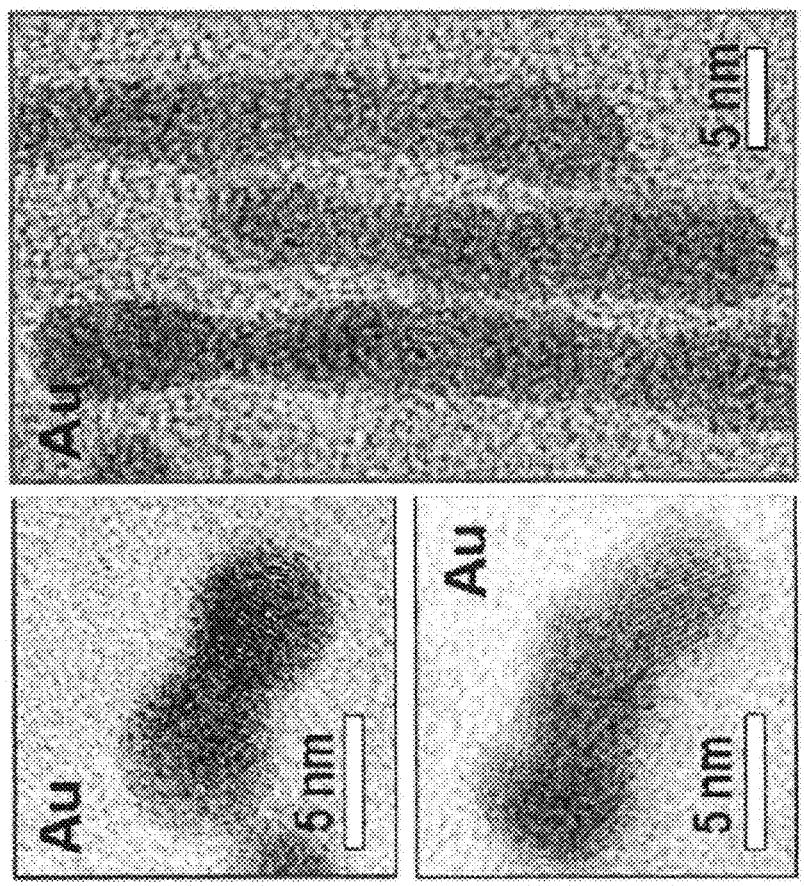
FIG. 6 shows representative transmission electron microscopy (TEM) images of sintered gold nanoparticles.

In addition to in situ HP-SAXS, TEM experiments were performed to follow the nanostructure changes. The TEM results further confirm that gold nanowires are formed through spherical nanoparticle sintering. Upon exposure to pressures above 8.9 GPa, the formation of numerous gold nanoparticle dimers, trimers, and nanorods was observed. High-resolution TEM images, shown in FIG. 6, indicate that the nanoparticles seamlessly sinter together along the nanowire c-axis, which distinguishes them from previously reported 1D nanoparticle nanostructures in which the nanoparticles are connected through organic ligands that are chemically bonded to each neighboring nanoparticle. TEM images indicate that gold nanoparticles sinter after applied pressures greater than 8.9 GPa. Continuous compression along [110] up to 13 GPa leads to the formation of nanorods and nanowires.

In general, the DAC is capable of maintaining a hydrostatic environment of loaded samples to pressure as high as approximately 9-10 GPa. Above this threshold, generation of deviatoric stress results in a pressure gradient vertically across the sample. This nonhydrostatic stress can be evaluated through quantitative texture analysis by unraveling 2D HP-SAXS patterns (Debye-Scherrer rings) into Cartesian (cake) plots of azimuthal angle as a function of 2θ. There is an evident waviness at pressure above 8.9 GPa, indicative of the generation of a nonhydrostatic stress field during compression of the nanoparticle film.

Figure 7:
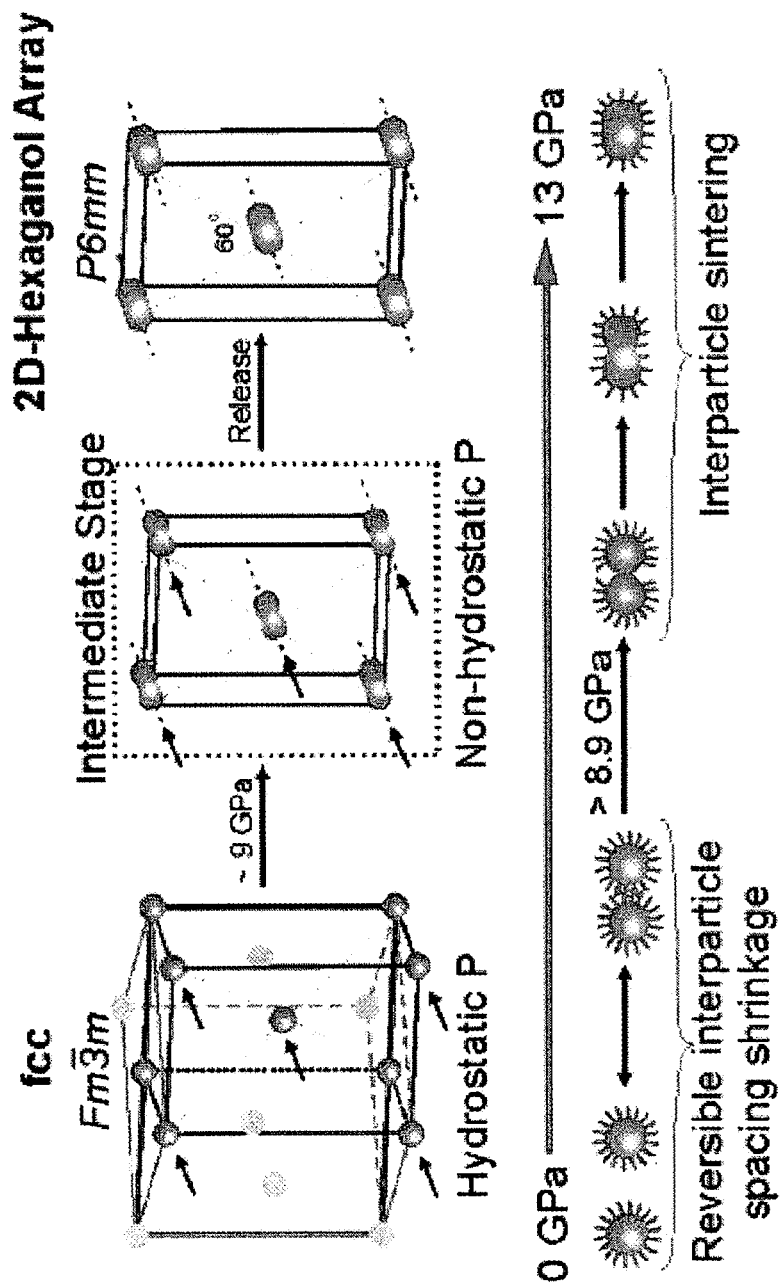
FIG. 7 is a schematic illustration showing the orientated sintering of metal nanoparticles into metal nanowire/nanorods arrays along the [110]-direction under compression.

Based on these experimental results, the formation of well-ordered 1D metallic nanostructures and their order arrays can be understood as shown in FIG. 7: below 8.9 GPa, the sample is compressed under a hydrostatic pressure field. The isotropic pressure applied uniformly through all directions to the nanoparticle assembly causes the fcc unit cell dimension to shrink uniformly. The fcc mesophase and its [110] orientation are retained. For pressures above 8.9 GPa, a nonhydrostatic stress is generated and applied perpendicularly to the nanoparticle film. Due to the [110]-orientation of the nanoparticle mesophase, nanoparticles along [110] direction receive much greater stress than other crystallographic directions. Thus, the nanoparticle sintering preferentially occurs along [110] direction. Continuous compression to 13 GPa drives the spherical nanoparticles to touch and finally sinter into 1D nanostructures (nanorods and nanowires) along the [110] direction. Ultimately, bundles (or arrays) of well-oriented nanowires with the c-axis along the former fcc [110] direction are formed.

In addition to the favorable orientation, it is noted that the initial nanoparticle assembly framework is crucial for the nanoparticle phase transformation and formation of nanowires. The mechanical flexibility of polystyrene matrices provides sufficient compressibility to maintain the ordered fcc mesophase and the favorable orientation while the unit cell dimension shrinks. In a pure gold nanoparticle fcc mesophase formed without using polystyrene matrices, the formation of nanowires was not observed. This may be due to the collapse of the fcc nanoparticle mesophase under high pressure. Furthermore, in an ordered gold nanoparticle/silica fcc mesophase, nanowires could not be obtained. This may be because the rigid, condensed silica layer between gold nanoparticles prevents adjacent nanoparticles from sintering.

Figure 8B:
FIG. 8(b) is a high-resolution TEM image of the silver nanoparticles.
Figure 8A:
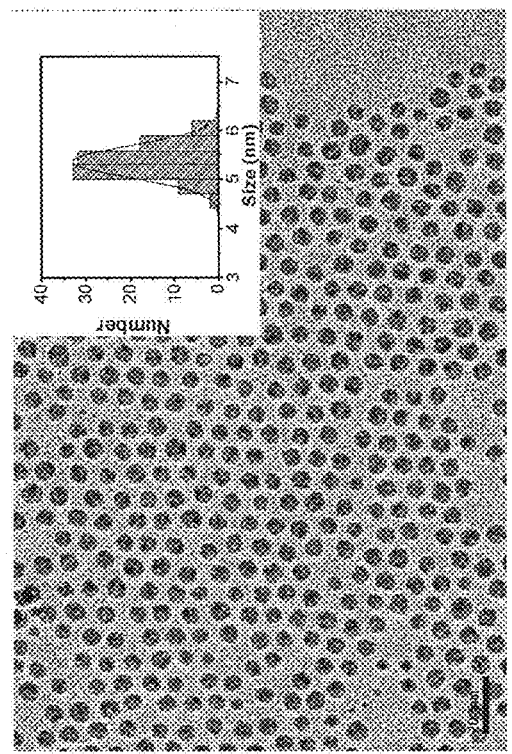
FIG. 8(a) is a TEM image of a starting silver nanoparticle assembly.

As another example, films of spherical Ag nanoparticle were compressed to tune the nanoparticle assemblies and synthesize 1D Ag nanostructures. FIG. 8 shows electron microscopy images of the periodically ordered silver nanoparticle starting material. FIG. 8($a$) is a TEM image of the starting silver nanoparticle assembly. The inset shows that the size distribution of the silver nanoparticles is very narrow with an average size of about 5 nm. FIG. 8($b$) is a high-resolution TEM image of the silver nanoparticles, showing that the silver nanoparticles are faceted with (111) face exposure.

Figures 9A, 9B:
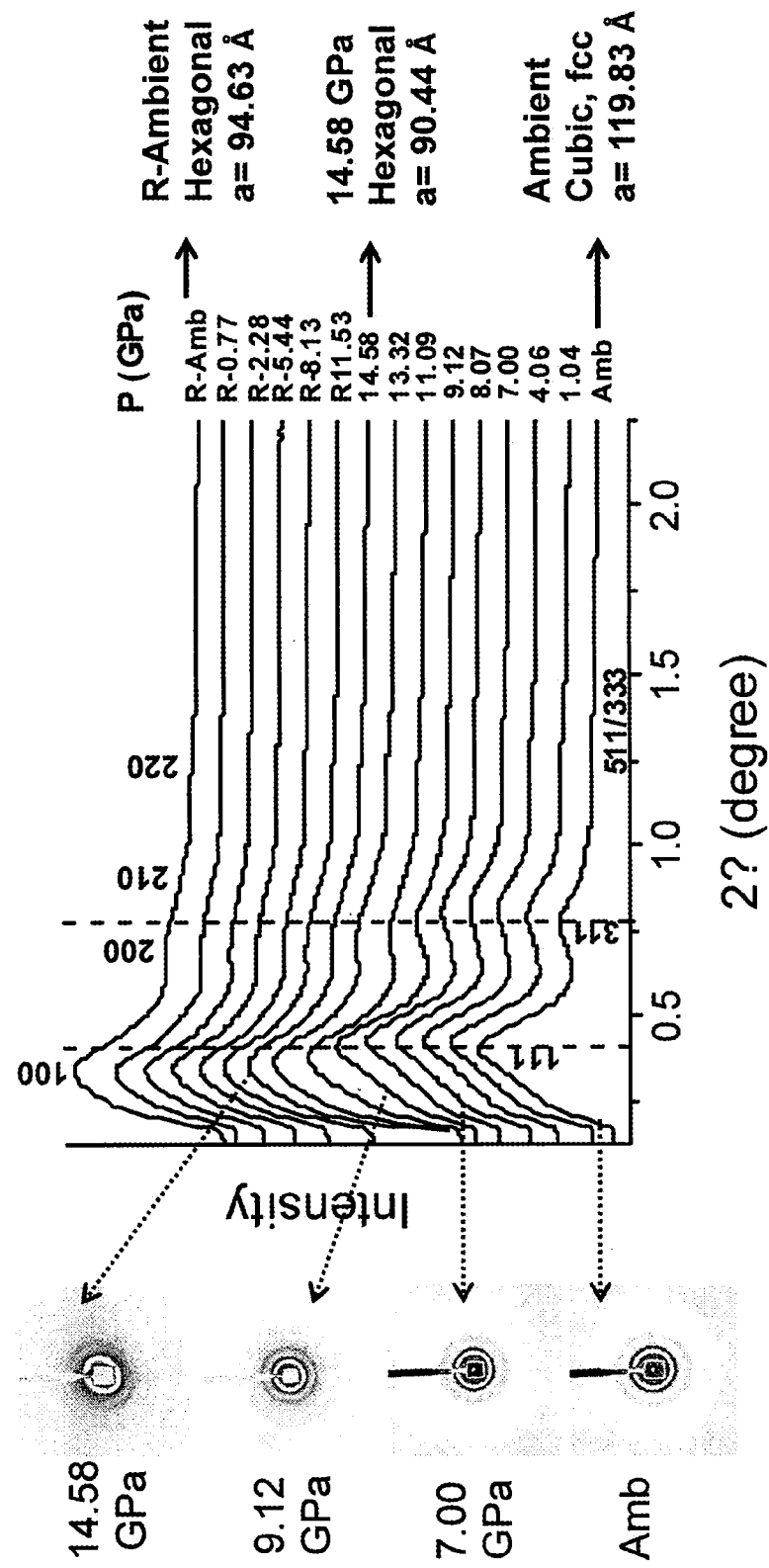
FIG. 9(a) shows HP-SAXS patterns of the silver nanoparticle assemblies at ambient pressure, 7.00 GPa, 9.12 GPa, and 14.58 GPa.
FIG. 9(b) shows integrated spectra derived from the HP-SAXS patterns.
Figure 9D:
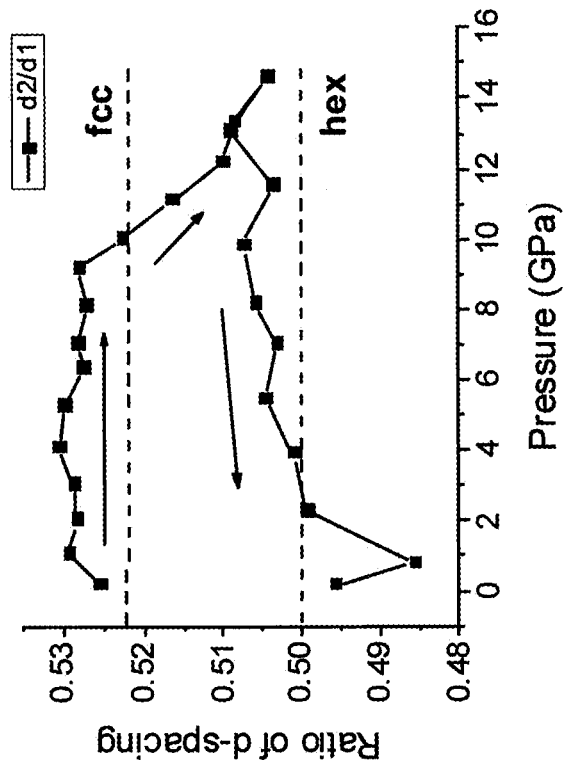
FIG. 9(d) is a graph of the d-spacing ratio $(d_{311}/d_{111})$ at different pressures.
Figure 9C:
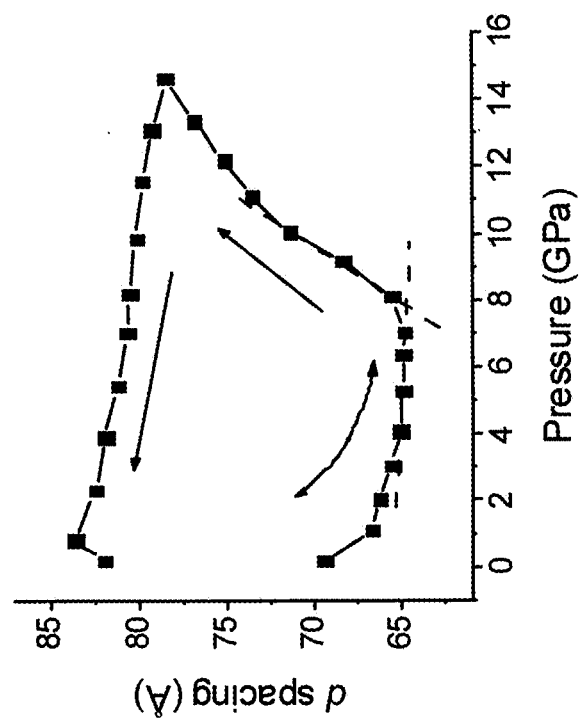
FIG. 9(c) is a graph of the $d_{111}$-spacing of the first Bragg reflection in each HP-SAXS spectrum.

FIG. 9 shows the structural evolution of the silver nanoparticle assemblies during compression and release. FIG. 9($a$) shows HP-SAXS patterns of the silver nanoparticle assemblies at ambient pressure, 7.00 GPa, 9.12 GPa, and 14.58 GPa. FIG. 9($b$) shows integrated spectra derived from the HP-SAXS patterns at various pressures P, in GPa, as a function or scattering angle, in 2θ, during compression and release. In these spectra, R-before the pressure value indicates a pressure release direction. At ambient pressure, the silver nanoparticle assembly exhibits an fcc structure. In the range from ambient pressure to a threshold pressure of about 8 GPa, HP-SAXS data indicate that the silver nanoparticle assembly remains in the fcc structure. As the pressure increases to 8 GPa, the HP-SAXS peaks shift slightly to higher 2 theta values (lower d spacing), indicating pressure-induced shrinkage in the unit-cell dimensions. When the sub-threshold pressure is gradually released to ambient, all peaks return to their starting positions, indicating the change in unit-cell dimensions is reversible up to about 8 GPa. However, when the pressure is increased above about 8 GPa, inter-nanoparticle distances start to increase (2θ decreases), indicating expansion of the inter-particle spacing in a direction perpendicular to the compression axis in response to compression in the inter-particle spacing in the parallel direction. Upon release of pressure to ambient, the expanded interparticle spacing is preserved. FIG. 9($c$) is a graph of the $d_{111}$-spacing of the first Bragg reflection in each HP-SAXS spectrum. The graph indicates that the interparticle spacing in silver nanoparticle assemblies is tunable during compression and release. Below the threshold pressure of about 8 GPa, changes in d spacing are reversible, as denoted by the bidirectional arrow. The nanoparticle assembly exhibits an intermediate structure between about 8 and 16 GPa. The unit-cell dimension changes are irreversible in this pressure range, as denoted by the unidirectional arrows. In this range, the nanoparticles begin to sinter, forming new nanostructures, such as nanorods and nanowires. FIG. 9($d$) shows the d-spacing ratio ($d_{311}/d_{111}$) at different pressures. Before 8 GPa, the mesophase of silver nanoparticle assemblies is fcc. Between 8 and 16 Gpa, the structure converts to hexagonal and remains hexagonal upon release of the pressure to ambient.

FIG. 10 shows TEM images of the silver nanostructures formed after pressure release from above the threshold pressure to ambient pressure. FIG. 10($a$) is a low resolution TEM image of the silver nanowires formed by compression at high pressure and release to ambient. FIG. 10($b$) is a HRTEM image of the formed silver nanowires.

Figures 11A, 11B:
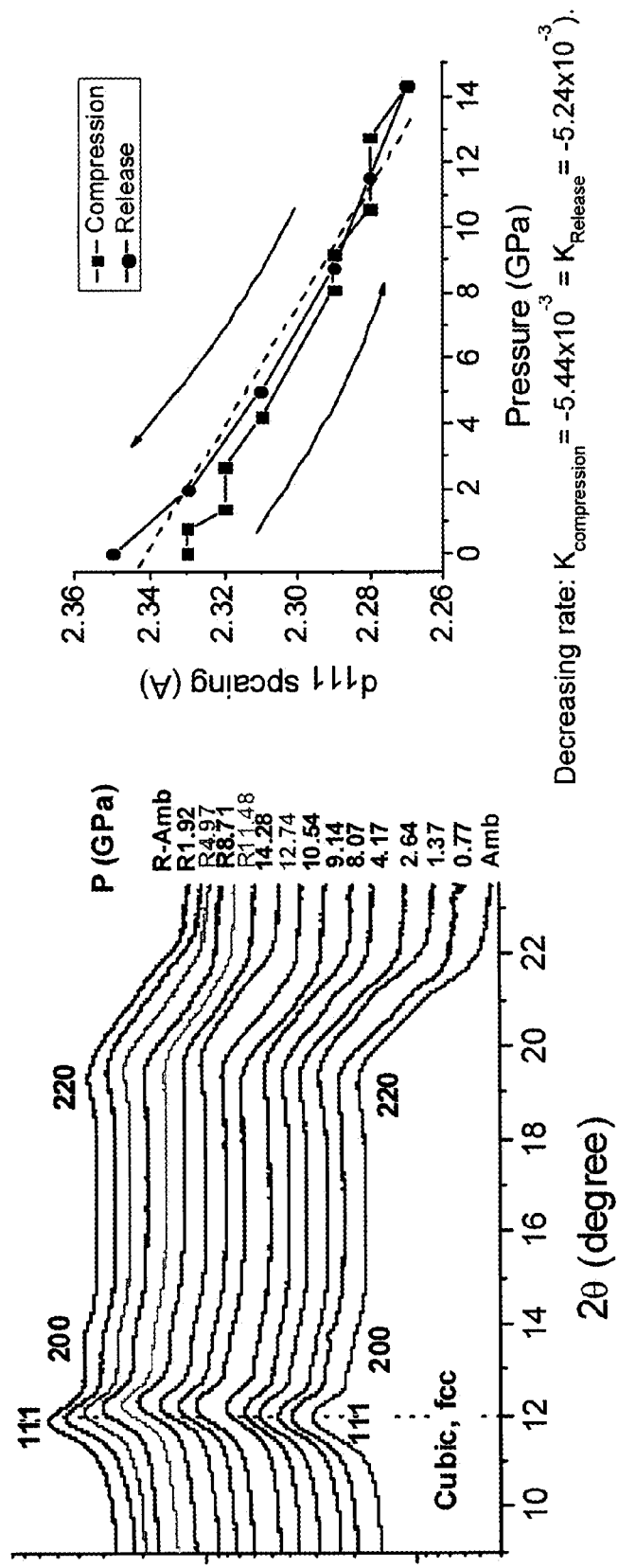
FIG. 11(a) shows integrated spectra derived from HP-WAXS patterns at various pressures during compression and release.
FIG. 11(b) shows the $d_{111}$-spacing of the first Bragg reflection (111) in each of the HP-WAXS spectra.

FIG. 11 shows the atomic lattice structural evolution of the silver nanoparticles in the assemblies during compression and release. FIG. 11($a$) shows integrated spectra derived from HP-WAXS patterns at various pressures during compression and release. FIG. 11($b$) shows the $d_{111}$-spacing of the first Bragg reflection (111) in each of the HP-WAXS spectra.

Figure 12:
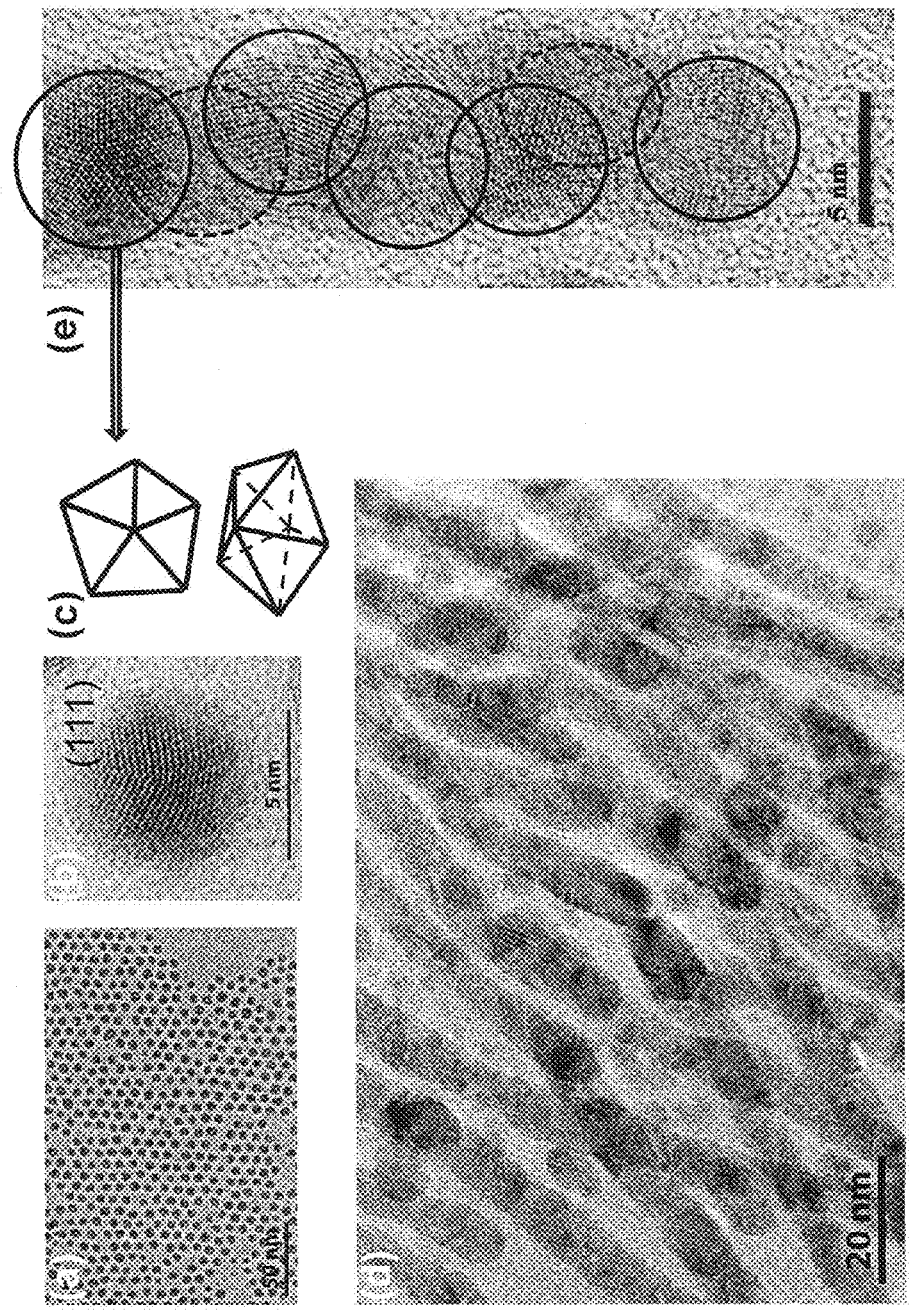
FIG. 12(a) is a TEM image of a silver nanoparticle assembly starting material.
FIG. 12(b) is an HRTEM image of the silver nanoparticle starting material.
FIG. 12(c) illustrates an ideal model of the decahedron silver nanoparticle structure.
FIG. 12(d) is a TEM image of a new single silver nanowire formed after compression to a high pressure and release to ambient.
FIG. 12(e) is an HRTEM image of the new silver nanowire.

FIG. 12 illustrates the oriented sintering and formation of silver nanowires. FIG. 12($a$) is a TEM image of the silver nanoparticle assembly starting material (before compression). FIG. 12($b$) is an HRTEM image of the silver nanoparticle starting material, showing the major shape is decahedron. FIG. 12($c$) illustrates an ideal model of the decahedron silver nanoparticle structure. FIG. 12($d$) is a TEM image of a new single silver nanowire formed after compression to a high pressure and release to ambient. The silver nanowire has a zigzag (or chiral) morphology. FIG. 12($e$) is an HRTEM image of the new silver nanowire. The HRTEM image clearly shows that the silver nanowires are polycrystalline. Along the c-axis, each nanowire consists of crystalline nanodomains having a size that is close to that of the spherical silver nanoparticles starting material. This observation indicates that the formation of the silver nanowires occurs through sintering of the (111) face of the spherical silver nanoparticles to form the nanowire c-axis.

FIG. 13 shows that the silver nanoparticles sinter together through (111) planes. FIG. 13($a$) is an HRTEM image of the silver nanowire showing the planes of the crystalline nanodomains. FIG. 13($b$) is a model of the sintering of three decahedral nanoparticles. The nanoparticles preferentially sinter on the (111) plane because this is the major plane on the surface of the decahedron-shaped silver nanoparticles. See H. Song et al., *J. Phys. Chem. C* 112, 2469 (2008).

Figure 14:
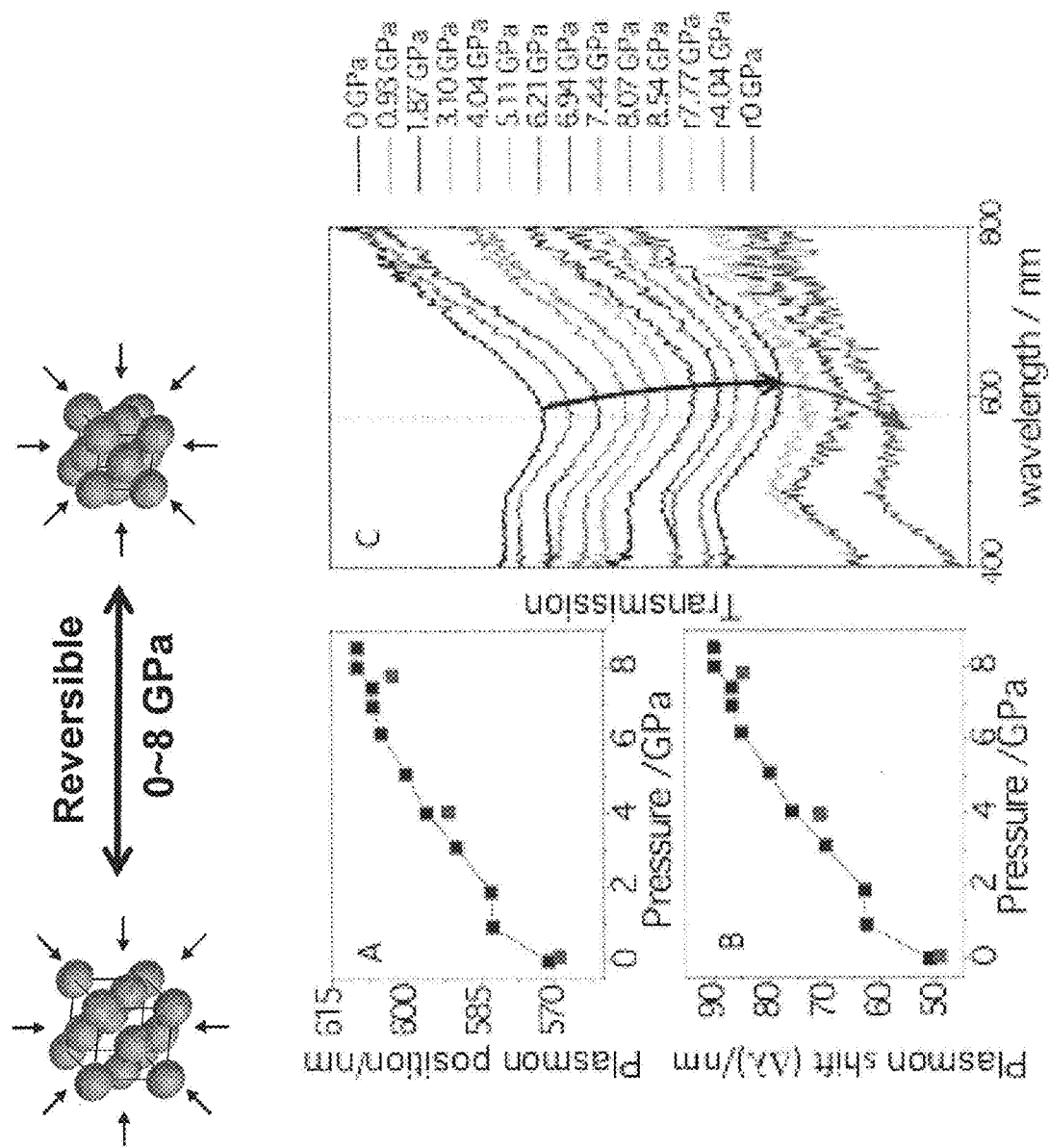
FIG. 14(a) shows the location of the plasmonic peak as a function of pressure for a silver nanoparticle assembly.
FIG. 14(b) shows the plasmonic peak shift as a function of pressure.
FIG. 14(c) shows transmission spectra at various pressures upon compression and release.

FIG. 14 shows an example of reversible pressure-tuning of an optical property, surface plasmon resonance (SPR), at applied pressures below the threshold pressure of about 8 GPa. SPR is the collective oscillation of electrons in a solid stimulated by incident light. The resonance condition is established when the frequency of light photons matches the natural frequency of surface electrons oscillating against the restoring force of positive nuclei. In particular, nanoparticles or nanowires of noble metals (typically gold or silver) can exhibit strong absorption bands in the ultraviolet-visible light regime that are not present in the bulk metal. FIG. 14($c$) shows transmission spectra at various pressures upon compression and release. The location of the plasmonic peak shifts to longer wavelength (i.e., red-shifts) as pressure is applied, but then returns to the starting peak location when the pressure is released (indicated by a small r in the caption). FIG. 14($a$) shows the location of the plasmonic peak as a function of pressure. FIG. 14($b$) shows the plasmonic peak shift as a function of pressure for the silver nanoparticle assembly. The SPR shift is about 40 nm overall and is tunable and reversible.

Figure 15:
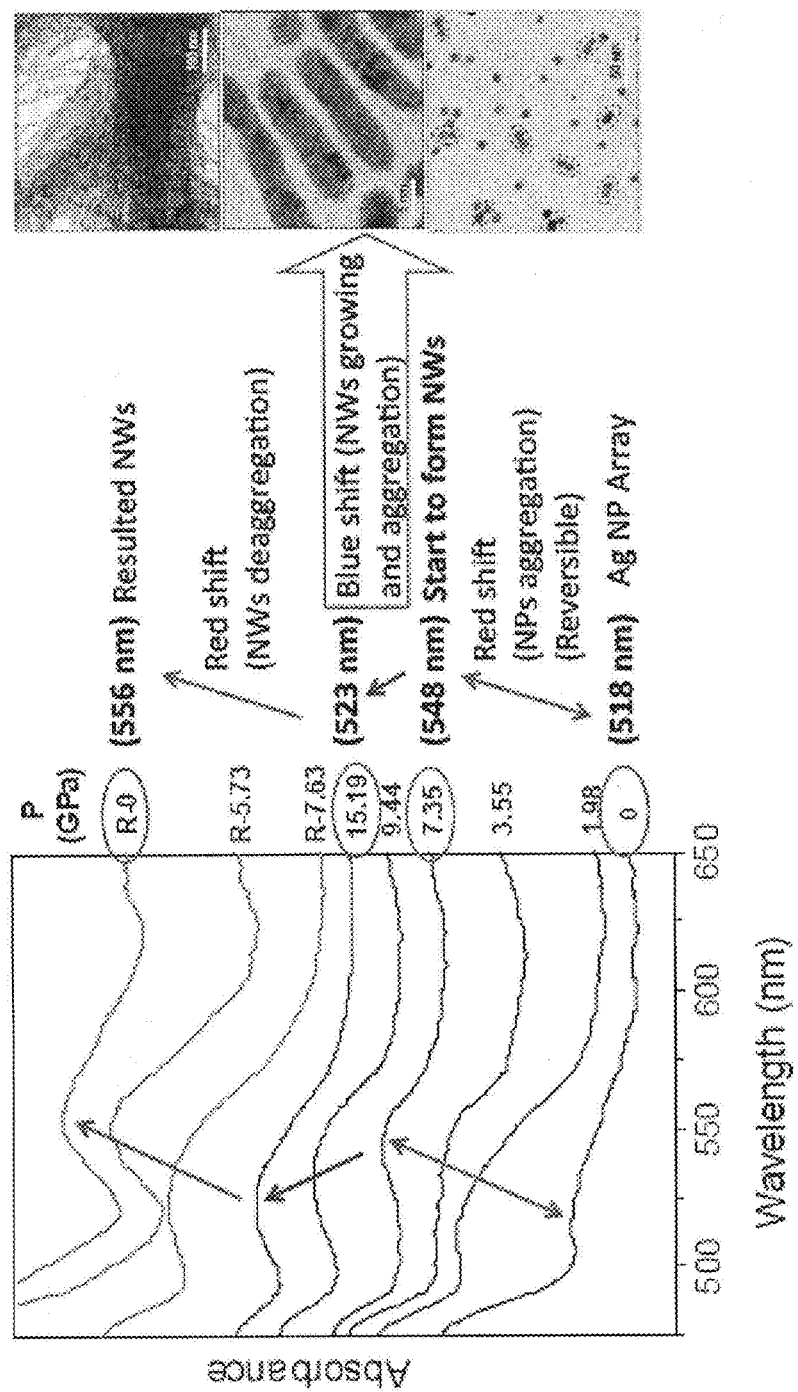
FIG. 15 shows UV-VIS absorption spectra of 5 nm Ag arrays during compression and release.

FIG. 15 shows UV-VIS absorption spectra of 5 nm Ag arrays during compression and release. The peaks at 7.35, 15.19, and R-0 GPa correspond to the nanostructures shown in the right TEM images. This example shows pressure-tuned shrinkage of interparticle spacing below 8 GPa, thereby inducing optical coupling of silver nanoparticles and a reversible red shift in the absorbance peak. Beyond the threshold pressure, a new nanostructure is synthesized, which causes new spectra. Initially, the absorbance peak is blue shifted as the new nanowires grow and aggregate. Upon release of the pressure, the peak red shifts as the new nanowires disaggregate.

The invention being thus described, it will be apparent to those skilled in the art that the same may be varied. Such variations are not to be regarded as a departure from the spirit and scope of the invention, and all such modifications are intended to be included within the scope of the following claims.

We claim:

1. A method for the synthesis of metallic nanostructures by mechanical compression, comprising:
   providing a film comprising a periodically ordered assembly of metallic nanoparticles in a pressure-transmitting medium; and
   compressing the film to a pressure above a threshold pressure above which the metallic nanoparticles of the periodically ordered assembly of metallic nanoparticles contact, coalesce, and sinter to synthesize a new nanostructure comprising a nanorod, nanowire, or nanosheet.

2. The method of claim 1, wherein the metallic nanoparticles comprise gold or silver.

3. The method of claim 1, wherein the pressure-transmitting medium comprises a liquid or polymer.

4. The method of claim 1, wherein the periodically ordered assembly comprises a face-centered-cubic mesophase.

5. The method of claim 1, wherein the pressure is applied with a diamond anvil cell.

6. The method of claim 1, wherein the pressure is applied with a piston-cylinder device, multi-anvil cell, or embossing machine.

7. The method of claim 1, wherein the threshold pressure is about 8 GPa.

8. The method of claim 1, further comprising releasing the pressure to ambient after synthesis of the new nanostructure.

9. The method of claim 8, further comprising redispersing the new nanostructure in an organic solvent after releasing the pressure to ambient.

10. The method of claim 1, wherein the compressing changes an optical property of the periodically ordered assembly of metallic nanoparticles.

11. The method of claim 10, wherein the optical property comprises a surface plasmon resonance.

* * * * *